US012670361B2

(12) United States Patent
Chan et al.

(10) Patent No.: US 12,670,361 B2
(45) Date of Patent: Jun. 30, 2026

(54) MACHINE LEARNING BASED TECHNIQUES FOR PREDICTING COMPONENT CORROSION LIKELIHOOD

(71) Applicant: Baker Hughes Holdings LLC, Houston, TX (US)

(72) Inventors: Godine Kok Yan Chan, Houston, TX (US); Okja Kim, Houston, TX (US); Tarik Borogovac, Wakefield, MA (US); Shyam Boriah, Somerville, MA (US); Mohamad Bagheri Esfe, Houston, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 895 days.

(21) Appl. No.: 17/878,511

(22) Filed: Aug. 1, 2022

(65) Prior Publication Data

US 2023/0065532 A1 Mar. 2, 2023

Related U.S. Application Data

(60) Provisional application No. 63/231,227, filed on Aug. 9, 2021.

(51) Int. Cl.
*G06N 3/042* (2023.01)
*G06N 3/08* (2023.01)

(52) U.S. Cl.
CPC .............. *G06N 3/042* (2023.01); *G06N 3/08* (2013.01)

(58) Field of Classification Search
CPC ......... G06N 3/042; G06N 3/08; G06N 706/12

(Continued)

(56) References Cited

U.S. PATENT DOCUMENTS 6,564,620 B1 * 5/2003 Jaeger ................... G01N 17/04
73/866.5
10,533,937 B1 1/2020 Shehri et al.
(Continued)

FOREIGN PATENT DOCUMENTS

CN 108776808 A 11/2018
CN 112740023 A 4/2021
(Continued)

OTHER PUBLICATIONS

International Search Report of PCT/US2022/074531.
(Continued)

*Primary Examiner* — Taghi T Arani
(74) *Attorney, Agent, or Firm* — Mintz, Levin, Cohn, Ferris, Glovsky and Popeo, P.C.

(57) ABSTRACT

A machine learning based method for determining a likelihood of corrosion of a component is provided. The method comprises receiving data associated with a portion of at least one component, the data describing one or more operating conditions of the portion of the at least one component, applying, to the data associated with the portion, a first machine learning model, determining, responsive to the applying of the first machine learning model, a likelihood of corrosion specific to the at least one component based at least in part on the one or more operating conditions of the portion, and outputting, automatically and without user intervention, the likelihood of corrosion specific to the at least one component on a display.

16 Claims, 8 Drawing Sheets

(58) Field of Classification Search
USPC ........................................................ 706/12
See application file for complete search history.

(56)                    References Cited

U.S. PATENT DOCUMENTS

|  |  |  |  |  |
|---|---|---|---|---|
| 10,643,324 | B2 | 5/2020 | Al Shehri et al. | |
| 10,871,444 | B2 | 12/2020 | Al Shehri et al. | |
| 11,162,888 | B2 | 11/2021 | Al Shehri et al. | |
| 11,276,158 | B2 | 3/2022 | Wen et al. | |
| 2013/0304680 | A1* | 11/2013 | Bailey ...................... | G06N 3/02 |
| | | | | 706/15 |
| 2018/0365555 | A1* | 12/2018 | Aslam .................... | G06N 3/084 |
| 2019/0362490 | A1 | 11/2019 | Wen et al. | |
| 2020/0072744 | A1 | 3/2020 | Al Shehri et al. | |
| 2020/0074616 | A1* | 3/2020 | Al Shehri ............ | G06N 3/0464 |
| 2020/0217777 | A1 | 7/2020 | Al Shehri et al. | |
| 2021/0018426 | A1* | 1/2021 | Amer .................... | G01N 17/04 |
| 2023/0220957 | A1* | 7/2023 | Alnaimi ................... | F17D 5/00 |
| | | | | 702/34 |

FOREIGN PATENT DOCUMENTS

|  |  |  |  |
|---|---|---|---|
| CN | 113056665 | A | 6/2021 |
| EP | 3844488 | A2 | 7/2021 |
| EP | 3894840 | A1 | 10/2021 |
| JP | 2020064808 | A | 4/2020 |
| JP | 6939995 | B2 | 9/2021 |
| JP | 2022-501617 | A | 1/2022 |
| KR | 20210048506 | A | 5/2021 |
| WO | 2020-047469 | A2 | 3/2020 |
| WO | 2020-123505 | A1 | 6/2020 |
| WO | 2020-047469 | A3 | 7/2020 |
| WO | 2020162098 | A1 | 8/2020 |

OTHER PUBLICATIONS

Written Opinion of PCT/US2022/074531.
Notification of Transmittal of the International Search Report and the Written Opinion of the International Searching Authority, or the Declaration of PCT/US2022/074531.

* cited by examiner

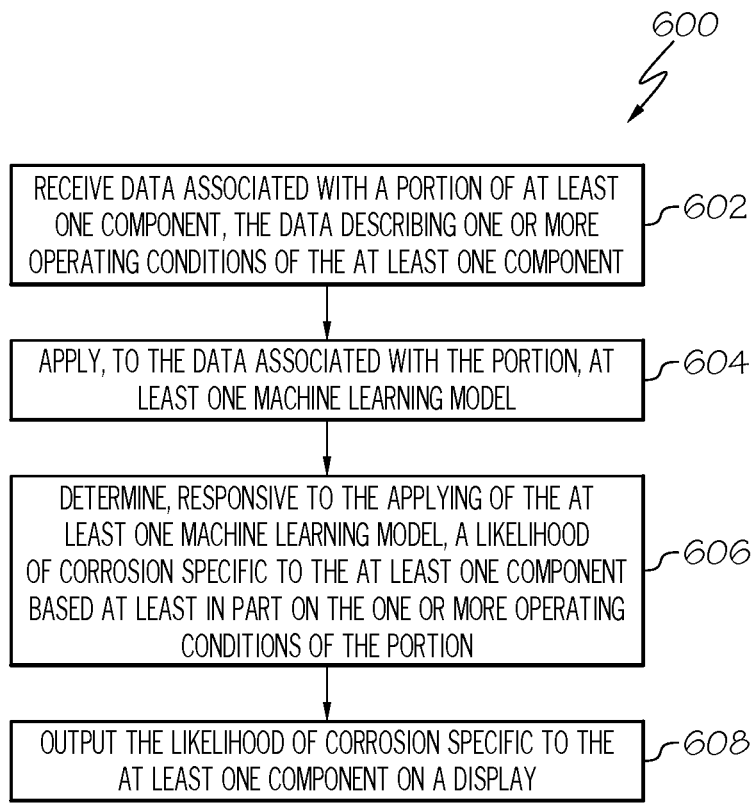

*600*

RECEIVE DATA ASSOCIATED WITH A PORTION OF AT LEAST ONE COMPONENT, THE DATA DESCRIBING ONE OR MORE OPERATING CONDITIONS OF THE AT LEAST ONE COMPONENT ⌐*602*

APPLY, TO THE DATA ASSOCIATED WITH THE PORTION, AT LEAST ONE MACHINE LEARNING MODEL ⌐*604*

DETERMINE, RESPONSIVE TO THE APPLYING OF THE AT LEAST ONE MACHINE LEARNING MODEL, A LIKELIHOOD OF CORROSION SPECIFIC TO THE AT LEAST ONE COMPONENT BASED AT LEAST IN PART ON THE ONE OR MORE OPERATING CONDITIONS OF THE PORTION ⌐*606*

OUTPUT THE LIKELIHOOD OF CORROSION SPECIFIC TO THE AT LEAST ONE COMPONENT ON A DISPLAY ⌐*608*

FIG. 6

MACHINE LEARNING BASED TECHNIQUES FOR PREDICTING COMPONENT CORROSION LIKELIHOOD

CROSS-REFERENCE TO RELATED APPLICATION

This application claims priority under 35 U.S.C. § 119(e) to, U.S. Provisional Application No. 63/231,227 filed Aug. 9, 2021, titled "MACHINE LEARNING APPROACH FOR PLANNING OF INSPECTIONS FOR CORROSION UNDER INSULATION", the subject matter of which is hereby incorporated by reference in its entirety.

BACKGROUND

Corrosion under insulation (CUI) occurs on external surfaces of various assets (e.g., pipes, and other comparable components). Typically, CUI may be caused by the presence of moisture between the insulation (e.g., by holes or cracks) and the exterior surface of the pipe. Moisture may accumulate from a variety of sources such as e.g., rain water, fluid leakage, temperature cycling, and so forth.

CUI may result in loss of containment and, depending on the product and pressure in the pipe, cause irreparable damage to both the pipes and the insulation.

SUMMARY

In an aspect, a method comprises receiving data associated with a portion of at least one component, the data describing one or more operating conditions of the portion of the at least one component, applying, to the data associated with the portion, a first machine learning model, determining, responsive to the applying of the first machine learning model, a likelihood of corrosion specific to the at least one component based at least in part on the one or more operating conditions of the portion, and outputting, automatically and without user intervention, the likelihood of corrosion specific to the at least one component on a display.

In another aspect, a system comprises at least one processor, a display that is communicatively coupled to the at least one processor, and at least one non-transitory storage media. The non-transitory storage media stores instructions that, when executed by the at least one processor, cause the at least one processor to perform operations comprising receiving data associated with a portion of at least one component, the data describing one or more operating conditions of the portion of the at least one component, applying, to the data associated with the portion, a first machine learning model, determining, responsive to the applying of the first machine learning model, a likelihood of corrosion specific to the at least one component based at least in part on the one or more operating conditions of the portion, and outputting, automatically and without user intervention, the likelihood of corrosion specific to the at least one component on the display.

Implementations of the above aspects are described in detail in the description below and illustrated in FIGS. 1-7.

BRIEF DESCRIPTION OF DRAWINGS

These and other features will be more readily understood from the following detailed description taken in conjunction with the accompanying drawings, in which:

FIG. 6 is a flow diagram depicts a process for determining a likelihood of corrosion specific to a component based on analyzing one more operating conditions specific to a portion of the component, according to one or more embodiments described and illustrated herein;

It is noted that the drawings are not necessarily to scale. The drawings are intended to depict only typical aspects of the subject matter disclosed herein, and therefore should not be considered as limiting the scope of the disclosure.

DETAILED DESCRIPTION

Corrosion under insulation (CUI) is a form of corrosion that occurs on the external surface of assets (e.g., insulated pipes). To reduce the adverse effects of corrosion on these pipes, periodic inspections may be performed. However, existing inspection techniques for prediction likelihood of corrosion on pipes have various deficiencies. Accordingly, there is a need for an accurate and non-intrusive technique of determining a likelihood of the presence of CUI in one or more components. For example, data generated from long-term inspection of assets may be combined with additional data to train machine learning models. These models may be employed to plan future asset inspections, prioritize inspection of assets that are predicted as having a likelihood of corrosion that is higher than other assets, and defer the inspection of assets having a likelihood of corrosion below a particular threshold to a later date. In this manner, risk of containment loss, improved use of inspection assets, and attendant cost savings may be realized. Accordingly, there is a need for an accurate and non-intrusive technique of determining a likelihood of the presence of CUI in one or more components.

In an example, inspections may be performed of components, equipment, and facilities. Components or equipment may be a pipeline and a facility may be a well pad. Further, individual locations may be segments of pipes on a pipeline or in the well pad. Most CUI susceptible locations can be inspected with non-destructive testing (NDT) in cycles of 3 or 5 years.

Figure 1:
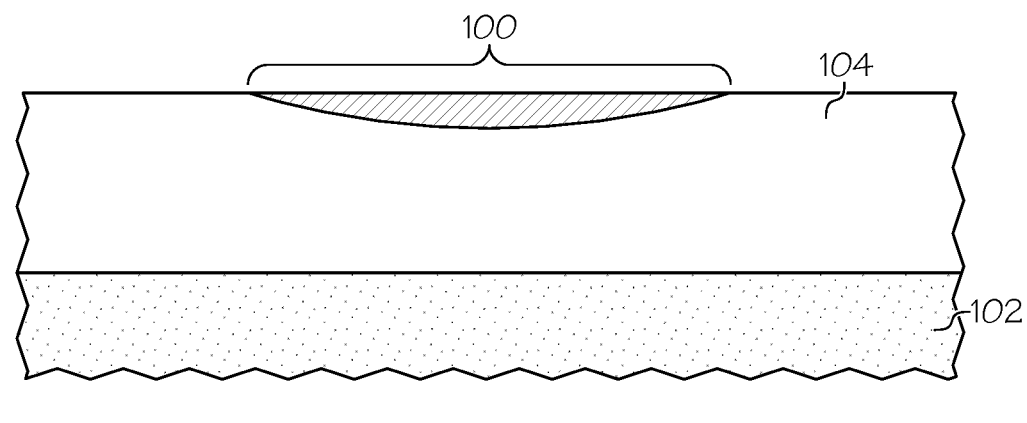
FIG. 1 depicts an illustration of a buildup of a layer of corrosion byproduct on a surface of a pipe, according to one or more embodiments described and illustrated herein.

FIG. 1 depicts an illustration of a buildup of a layer of corrosion byproduct 100 and moisture 102 on one or more surfaces of the pipe 104, according to one or more embodiments described and illustrated herein. In an embodiment, a testing technique in the form of Tangential Radiographic Testing (TRT) may be utilized, as described below.

For example, the pipe 104 illustrated in FIG. 1 may be a part of a pipeline that is buried several feet underneath the surface and may be enclosed by an insulating layer, e.g., a jacket. Due to changes in the climate, surface topography, the composition of fluids that flow through the pipe 104, the frequency with which these fluids flow through the pipe 104, and so forth, corrosion byproduct 100 and moisture 102 may accumulate on the pipe 104. Various techniques, e.g., Tangential Radiographic Testing ("TRT") described above, may be utilized to obtain data related to a current condition of a pipe, e.g., pipe 104. From TRT, as illustrated in FIG. 1, an amount of buildup of moisture 102 and corrosion byproduct 100 between the pipe 104 and an insulation layer that is positioned on an exterior surface of the pipe 104 may be determined. It is noted that the amount and severity of the accumulation of the moisture 102 and the corrosion byproduct 100, upon exceeding a particular threshold, may cause significant damage to the operational life of the pipe 104. Moreover, apertures may form on the outer surface of the pipe 104 as a result of the accumulation of the moisture 102 and the corrosion byproduct 100. Fluids may leak through these apertures into areas that are external to the pipe 104. Such leaks may result in environmental damage and further reduce the operational life of the pipe 104.

It is noted that TRT does not directly show corrosion damage. Instead, as illustrated in FIG. 1, results of the TRT test may show presence of the moisture 102 and corrosion byproduct 100, both of which may be used to estimate the likelihood of corrosion. In particular, the presence of visible corrosion byproduct 104 may be indicative of active corrosion. Further, it is noted that size measurements of corrosion byproduct, e.g., from images captured of the pipe, may be used to estimate the degree of the corrosion damage on the pipe. The byproduct itself can vary in density and TRT images can show cross-sectional area, rather than the volume of byproduct.

Figure 2:
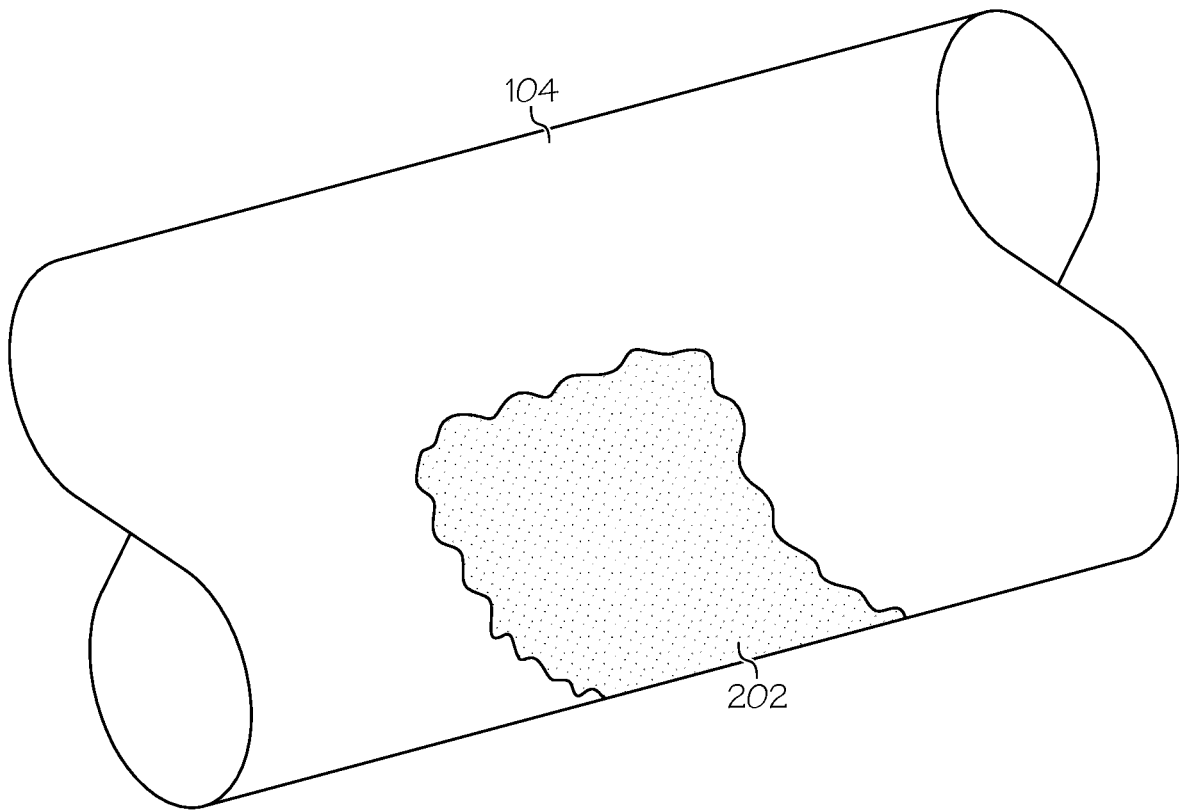
FIG. 2 depicts a presence of corrosion on a pipe.

FIG. 2 depicts the presence of corrosion on a pipe. In particular, the pipe 104 is shown in a stripped condition. As illustrated, multiple layers on the outer surface 202 of the pipe 104 have suffered damage and it is likely that fluid may leak from one or more apertures on the outer surface of the pipe 104, causing damage to both the pipe 104 and the surrounding environment.

Figure 3:
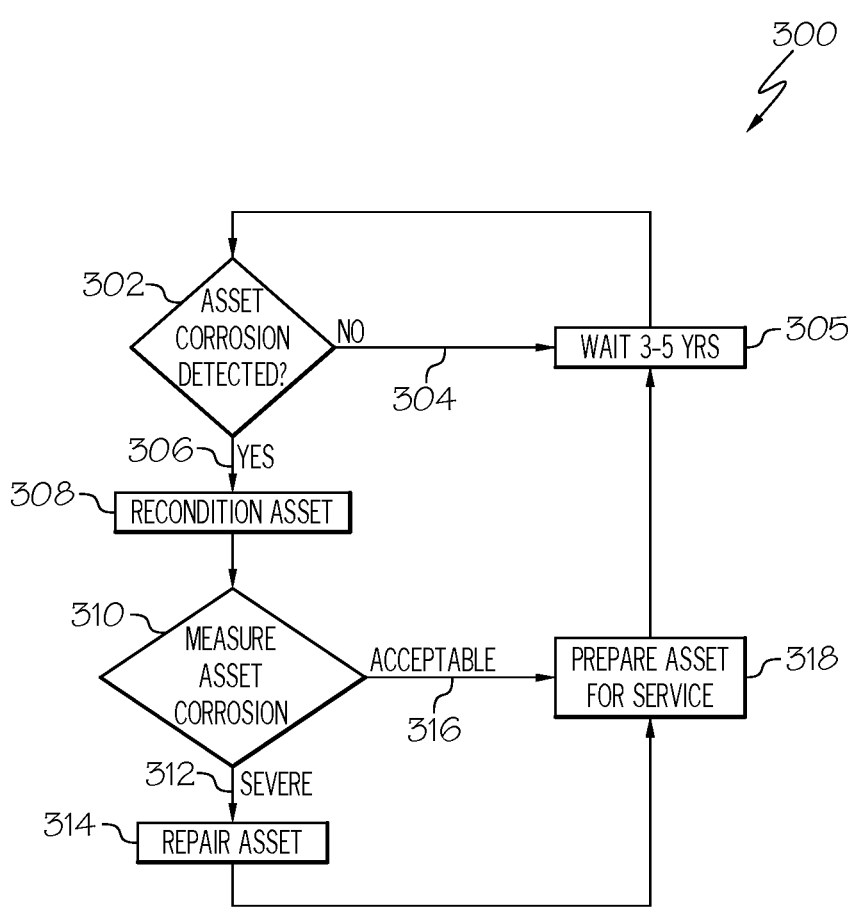
FIG. 3 depicts example processes and techniques that are utilized to assess operating conditions of various components.

FIG. 3 depicts example processes and techniques utilized to assess operating conditions of components. Conventionally, as shown in block 302, TRT testing may be utilized to determine properties from which asset corrosion may be determined. If asset corrosion is not detected (block 304), the process may require waiting and performing the TRT testing at a later date, e.g., after 3 to 5 years (block 305). TRT testing suffers from a deficiency, e.g., inaccuracy when estimating metal loss and determining presence or depth of individual pits from analysis of images of pipes. To partially mitigate this deficiency, periodic in-line inspections may be utilized as a technique to supplement TRT in order to determine current conditions of pipes. In operation, ILI may be utilized to accurately estimate external pipe wall loss. However, ILI also suffers from various deficiencies, e.g., missed detections, false positives, and measurement variance.

In embodiments, subsequent to the performing of the ILI in association with the TRT evaluation, it may be determined that the pipe 104 may have to be reconditioned (block 308)

due to, e.g., detection of factors associated with corrosion (block 306). Additionally, at other locations where TRT or ILI results provide a positive indication of the presence of corrosion, a follow-up can be scheduled. Follow-up scheduling is based on priority and estimated condition, but in most cases, it can be performed within approximately one year or less from the date of initial detection of corrosion. Alternatively, as stated above, at locations where TRT or ILI results provide a negative indication of new corrosion initiation, no follow-up is scheduled. In such instances, further inspection can be scheduled, e.g., approximately 3 to 5 years later.

Follow-up can involve reconditioning the asset, further measurements of asset corrosion, repair, and further preparation that may ensure that a component, e.g., the pipe 104, is in a condition to enable satisfactory operation of the component. In embodiments, assuming that the asset is a pipe that is enclosed with insulation, reconditioning of such a pipe may include removing the insulation and cleaning off active corrosion. Corrosion measurement can include measuring corrosion damage (block 310) with ultrasonic testing (UT) or pit gauge (PG). If the condition of the pipe is found to be severe (block 312) during asset corrosion measurement, one or more sections of the pipe may be repaired (block 314). Otherwise, if the condition of the pipe is found to be in fair or acceptable operating condition (block 316), the clean pipe (e.g., the asset) may be prepared for service by being coated with paint that protects the underlying asset, wrapped with new insulation and other materials (block 318), and so forth. These steps can be carried out in a way that prevents further moisture ingress and corrosion initiation. In this way, all positive detections (indicative of a likelihood of corrosion) may be followed up, and regardless of whether that follow-up is a mitigation or repair. Adequate follow up may prevent buildup of active corrosion at a location such that the location is newly protected from moisture ingress and wetting of the pipe. It is noted though that the above processes are tedious and error prone. As such, a machine learning based technique for predicting likelihood of corrosion is contemplated.

Training and Application of Machine Learning Model For Predicting Corrosion Likelihood In order to train a machine learning model, as described in the present disclosure, for the purpose of predicting a likelihood of corrosion, different types of data may be analyzed. For example, four categories of data may be collected and analyzed: inspection history, asset data, production data, and environment data. With respect to the data discussed below, an asset may be classified as a pipe, pipelines, and so forth.

Inspection history can include, but is not limited to, a location identifier, timestamp, inspection method, moisture (e.g., a measurement of how wet the pipe is under the insulation), corrosion presence, piping condition, condition of jacket and insulation, measurements, observations, and a technician identifier.

Asset data (as-built and designed) can include, but is not limited to, pipe segment physical location, location within piping network, equipment or facility membership, interconnections with upstream and downstream locations, service type, component type, dimensions, material, insulation type, physical support members, orientation, slope, and date installed.

Production data may be generated from sensors at the wellhead and can include, but is not limited to, product type (e.g., oil, gas, injection water, etc.), production history, daily product temperature, volume, shut in, pressure, and slugging.

Environmental data can include, but is not limited to, flood zone and weather (e.g., environmental temperature, environmental precipitation, environmental moisture, etc.)

Prediction models can be built on inspection locations. The inspection locations may be individual physical segments of pipe, e.g., weldpacks. In embodiments, a number of inspection locations can vary. For example, data regarding approximately 500,000 weldpacks may be obtained and analyzed. Further, properties associated with each of these weldpacks may vary significantly, e.g., dimensions of the physical segments may vary significantly. For example, some locations are only a few feet long, while others may be 40 or more feet long, especially for larger diameter pipes such as, e.g., flow lines. In general, a location may be a logical units for which all inspections are performed, recorded, tracked and understood. For example, when multiple corrosion defects are found near each other by an inspection, the results are summarized and stored by their weldpack location identifiers. And the location identifiers are also utilized for tracking the locations of the respective weldpacks.

Data that is tracked at the level of equipment, rather than constituent locations, can be mapped to these locations. For example, production temperature history can be tracked at the level of a pipeline including many locations. Therefore, each location along the pipeline can be assumed to have that same temperature history. Similarly, data that is common to the whole field, such as weather data, may be mapped to every location. Therefore, every data source may be appropriately mapped and applied to the individual inspection locations and may represent a history specific to that location (e.g., inspection history, data relating to one or more sections of a pipe, and so forth).

In embodiments, as part of training of the machine learning model, data that is associated with various locations may be associated with known properties, which are related to a particular output at a particular location of the pipe. These properties may characterize risk factors that may at least partially cause corrosion or may be associated with factors that may cause corrosion. For example, the presence of moisture and operating temperature may both be considered risk factors individually but when each has a value that satisfies a particular threshold, it may be determined that the conditions are closely associated with a high likelihood of corrosion.

In embodiments, the first step of training the machine learning model as described herein includes identification and construction of candidate features. A part of this step is the performing of feature selection, or the testing and pruning of many candidate features by empirically inspecting their joint importance and predictive power. It is noted that many features were selected for use in the models, from many more candidates that were created and considered. A subset of features are described below. Additionally, feature engineering and selection are discussed in greater detail later on in this disclosure.

It is noted that data that is obtained for the purposes of training the machine learning model as described herein may be from inspection history data, asset data, production data, and environmental data. Each of the different types of data are described below.

Regarding inspection history data, most locations may have been inspected multiple times in the past and may have records on condition and moisture estimates over time. From these historical inspection records, data associated with moisture accumulation and variations in moisture accumulations over a particular time frame may be taken, e.g., associated with various locations. From inspection timestamps, the time since last inspection may be calculated. For locations that had any previous mitigation or repair, the work that was done, the measurements of piping condition that were taken, and the time elapsed since that work was performed may also be included.

Regarding asset data, additional features useful for machine learning may include data describing the physical properties of each individual pipe segment (e.g., asset). This may include the material of the pipe and insulation, the location of the pipe, the manufactured joint type of the pipe segment, physical support units attached to the pipe, and other information about its connection to other equipment in the facility. Design information such as the pipe dimensions (e.g., diameter, length, surface area, etc.) and distance to a production well of a pipe segment may also be obtained.

Production data may be obtained from sensors at a particular well head. Therefore, for most well lines, including production and injection lines, records are available for daily temperatures, hours of operation, and volumes of flowing product for each day. From this timestamped data temperature statistics, such as average, range and variability, as well as counts of shut-in periods by their durations may be determined. For example, over 20 years or operation a well line may have had 10 shut-ins of less than two days, 5 shut-ins of 1-2 weeks and one long shut in of seven months. Also, the well line may have switched from production to injection at some point. All such data may be encoded into respective features.

Figure 4:
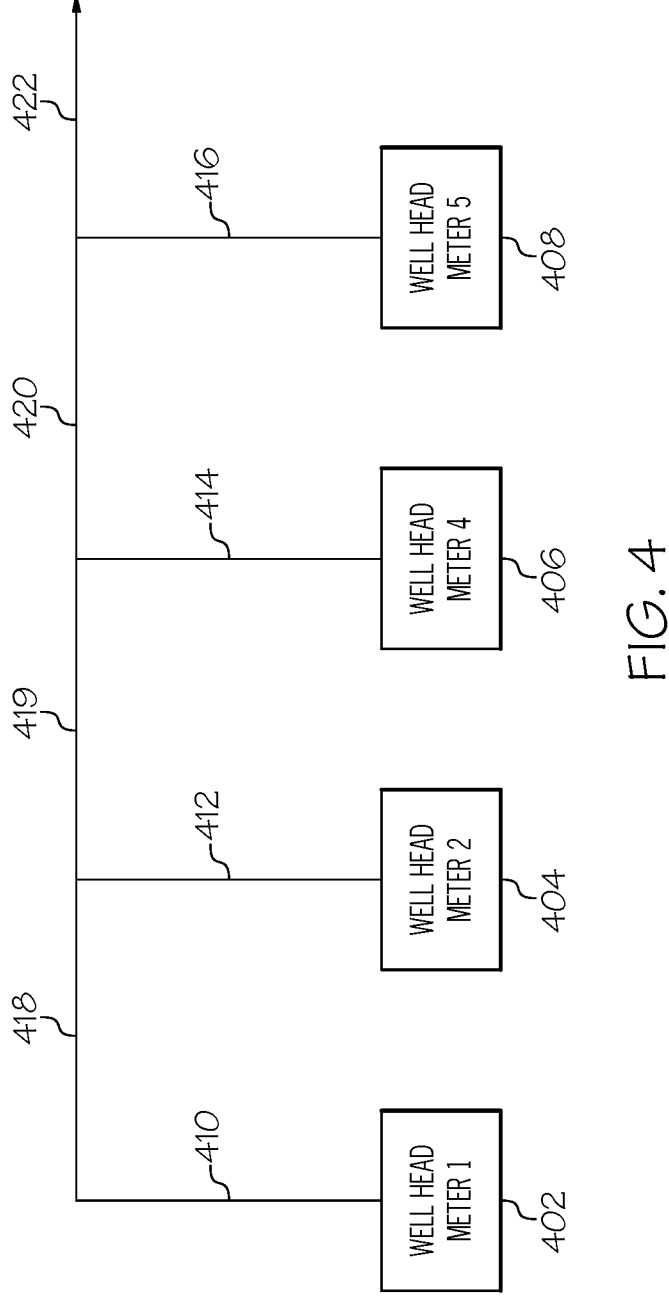
FIG. 4 is an illustration of the obtaining and mapping of production data from well-head meters for training the machine learning model of the present disclosure, according to one or more embodiments described and illustrated herein.

FIG. 4 is an illustration of the obtaining and mapping of production data from well-head meters for training the machine learning model of the present disclosure, according to one or more embodiments described and illustrated herein. In particular, production data from each of the well heads 402, 404, 406, and 408 connected to each of the well lines 410, 412, 414, and 416, may be obtained. It is noted that these well lines may be connected to downstream lines 418, 419, 420, and 422. As such, data of production may also be obtained from these downstream lines. For example, data relating to flow rate data, temperature data, and so forth of various fluids such as, e.g., oil, natural gas, etc., may be obtained and stored in memory of a computing device for the purpose of training the machine learning model.

In embodiments, for the purposes of feature generation, joined lines downstream from a well, data regarding connections of the piping between equipment in the asset line, and so forth, may be combined with the production data. It is noted that the joined line may be taken as a composite of the upstream well lines. For example, one line may take in flow of two or more well lines. In such an instance, the daily temperatures may be calculated based on the source line temperature and production data, and various temperature features that may be derived from these features.

Additionally, it is noted that there may be lines that are not equipped with well head meters. For those, imputed average temperatures can be based on product that is carried. For example, oil may be assumed to have an average temperature of 140° F. and gas at 75° F. Other production features, such as variance of temperature and shut-ins can be left as unknowns.

Environmental data may relate to slugging experienced by pipes, various flood zones in which the pipes may be positioned, and so forth. Environmental data may also be associated with lines and locations of lines that have been known to have experienced slugging and those that may traverse flood zones that may be created during annual snowmelt periods. Those were mapped to individual locations and encoded as features as well.

It is noted that three separate models may operate in conjunction in order to generate an output, e.g., an output in the form of a likelihood of corrosion specific to a component (e.g., an asset in the form of a pipe) based at least in part on one or more operating conditions of a portion of the component.

There are three component models that generate predictions about the unknown state and future progression of corrosion at inspection locations may include: (1) corrosion initiation model, (2) short term worst case remaining pipe wall thickness model and (3) long term remaining pipe wall thickness model under assumption of initiation.

The predictions from these three core models together can provide the information needed to make decisions about how to execute future inspections. These models are summarized in Table 1 below. In particular, Table 1 below includes the following categories: "Objective" (e.g., objective of the model), "Use case and value", "Dependent variable(s)", "Output of trained model", "Learning data volume", "Machine Learning Model", and "Baseline (current inspection)."

TABLE 1

| | Model Summary | | |
|---|---|---|---|
| | Corrosion initiation | Short term wall loss | Long term wall loss |
| Objective | Predict probabilities of new corrosion initiation for every location | Estimate current and near term wall loss in locations where a recent TRT found likelihood of new corrosion | Predict long term wall loss in locations where a conducted TRT inspection did not indicated likelihood of corrosion; However, an assumption that corrosion has initiated was made |
| Use case and value | Plan inspection campaigns to find more corrosion Prioritize portions of pipes or components that are more likely to have corrosion Defer inspections on asserts that less likely to have corrosion | Prioritize follow-up mitigation and repair of corrosion based predicted piping condition | Control risk of implementing model-based inspection planning by understanding & setting a statistical upper bound threshold associated with a worst case piping condition, e.g., for locations where inspection is deferred |
| Dependent variable(s) (quantity being predicted) | Event that NDT inspection (TRT) shows evidence of new corrosion at location (prediction is probability of the event) | Deepest pit metal loss at location directly measured by UT/PG during follow-up | Deepest pit metal loss at location directly measured by UT/PG during follow-up |
| Output of Trained Model | Predict probability that TRT at time (b) will be positive, by knowing full history up to but excluding time (b) | Predict depth measurement of deepest pit at time (c), knowing all data up to and including TRT inspection at time (b). Notably, this includes the fact that TRT at time (b) is positive for corrosion. | Predict depth measurement of deepest pit at time (c) plus statistically bounded safety margin, given all data except outcome of inspection (b). This is because under the use case, this model would be used for locations where TRT inspection (b) which finds a problem is instead deferred. In training, the outcome of (b) is censored, but there is an assumption that the TRT at (b), if it had happened, would have been positive. |
| Learning data volume (rows) | ~600K TRT inspections | ~17K wall thickness measurements, deepest pit at each location, | ~9K wall thickness measurements, deepest pit at each location, |
| Machine learning model | Neural network | Regression | Regression and statistical analysis |
| Baseline (current inspection) | 1.7% find rate in historic inspections | Not applicable | Not applicable |

9

Regarding the corrosion initiation model (e.g., a first machine learning model), it is noted that the model may be trained to predict which locations, not currently known to be corroding, may be more or less likely have experienced corrosion prior to the next TRT inspection. The predictions can be the estimated probabilities that each location may have an instance of corrosion, thereby allowing, e.g., an inspection team, to differentiate the locations prior to inspecting them, e.g., based on available past data. In embodiments, the corrosion initiation model may be implemented as a classification network operating on features as described above. The two classes are:

$$trt\_pos\_n = \{ \begin{array}{l} 1 \text{ if corrosion is found at the location} \\ 0 \text{ if no corrosion is found at the location} \end{array} \}$$

For the purposes of training the machine learning model, the ground truth label or dependent variable $trt\_pos\_n$, which represents a predicted outcome of a next inspection, may indicate that corrosion has initiated. As part of training, whether corrosion has initiated at a particular location may be known, but temporarily masked or censored in order to facilitate training of the model. For each location and historical inspection time, the independent variables, or features as defined above, are restricted to data describing a condition of an asset prior to the inspection.

In embodiments, the classes may be highly imbalanced (e.g., only 1.7% corrosion may be identified based on analysis of historical TRT inspections data). It is noted that, over time, every asset will experience some degree of corrosion. But few locations may experience corrosion between inspections that recur (e.g., every 3 to 5 years). Additionally, under the current inspection techniques, all locations may be inspected within this time frame, namely in the time frame of 3 to 5 years. It is noted that the trained machine learning model of the present disclosure operations to more accurately identify assets that will likely experience corrosion within the time frame of 3 to 5 years, in addition to identifying assets that are less likely to suffer from corrosion within the 3 to 5 year time frame.

In embodiments, the machine learning model may also be trained to identify locations that have a higher chance of initiation than the baseline percentage of 1.7%. Further, the model may be trained to identify locations that have a lower

10

Namely a large penalty for predicting 0 can be included. As such, the truly low scores are given to only those locations that have few or no risk factors.

Measures can also be adopted to ensure that the model does not overfit. Overfitting refers to when a model learns apparent relationships from the training data that perhaps only occurred by chance, and as such, may be considered statistical noise. Overfitting is an aspect present in all statistical modeling, but is especially relevant under the following two conditions: (a) when the amount of training data from which a model learns is small or (b) if the model is particularly sophisticated. A model may be classified as being sophisticated or complex if there are many input features and many kinds of non-linear relationships that are present between these features.

As the training data set utilized for training the present model is large and diverse, overfitting due to scarcity of available training data may not be applicable to the models described herein. It is noted that, as part of training the machine learning model of the present disclosure, various factors have been identified as being associated with higher or lower incidence of corrosion. In embodiments, each of these factors are encoded as features that is analyzed by the model for training. Further, it is noted that the model is highly non-linear and sophisticated, namely because the training of the model involves analyzing complex relationships, many of which have respective exceptions. Therefore, in some examples, overfitting of data may occur due to the complexity of the model.

To address and overcome overfitting, cross validation of the data may be performed. Cross-validation successively partitions the training data set into many sub-batches in order to iterate between learning on at least a subset of these batches. Cross-validation enables determination of whether the model is accurately learning. It is noted that hard hold-out data sets may be employed for testing purposes.

Table 2, provided below, illustrates various results of training and testing the machine learning model of the present disclosure. In particular, the dataset categories of "Training dataset", "Validation dataset", "Testing dataset", and "Blind Test dataset" are provided with respect to various aspects of an asset (e.g., a pipe), e.g., unique locations, start date of an inspection, end date of an inspection, number of inspections performed within a predetermined time frame, and so forth. Various results associated with each of these respective datasets are also provided below.

TABLE 2

| | | | Training Dataset | Validation Dataset | Testing Dataset | Blind Dataset |
|---|---|---|---|---|---|---|
| Corrosion initiation outcome of training and validation | | | | | | |
| Data | Inspection results all locations | Unique locations | 261,413 | 37,372 | 63,184 | 98,962 |
| | | Start date | Jan. 1, 2008 | Jan. 1, 2008 | Aug. 29, 2017 | Aug. 30, 2018 |
| | | End date | Aug. 29, 2017 | Aug. 29, 2017 | Aug. 29, 2018 | Aug, 1, 2019 |
| | | Inspections count | 383,733 | 54,988 | 63,228 | 98,962 |
| | | Corrosion Finds | 5,910 | 820 | 1783 | 1,575 |
| | | Baseline Rate (%) | 1.54% | 1.49% | 2.82% | 1.60% |
| Model Predictions | TRT positive (P >= 6%) | Count | 14,999 | 2248 | 7,168 | 8,741 |
| | | True Finds | 1,798 | 238 | 822 | 490 |
| | | Find Rate (%) | 11.99% | 10.59% | 11.47% | 5.61% |
| | TRT negative (P < 0.5%) | Count | 136,659 | 19,520 | 15,139 | 32,810 |
| | | False Omissions | 111 | 52 | 46 | 102 |
| | | False Omission Rate (%) | 0.08% | 0.27% | 0.30% | 0.31% | rate of initiation than the baseline. This imbalance can be addressed by using a weighting factor for fitting the model.

Regarding the training dataset, the classifier of the machine learning model of the present disclosure may be trained with cross-validation on a dataset in which 7/8 of the locations are associated with past inspection outcomes from a predetermined time period.

Regarding the validation dataset, a first type of testing hold-out set may be utilized for training the model such that the remaining ⅛ of locations for the same period may be used for training purposes. It is noted that partitioning by location, rather than by individual inspection, is advisable because many locations may have had more than one inspection performed during the 10 year period. The testing dataset may include data regarding inspections that were performed for a number of locations after a particular date, e.g., a date on which a training may have ended (i.e. a cut-off date). The testing dataset mimics the manner in which the model is naturally used. It is noted that the model may be trained using all data that is known up to a particular point, e.g., the current time.

The blind dataset may include data regarding inspections that were performed for various locations at a particular date that far exceeds, e.g., a date on which a training may have ended (i.e. a cut-off date). For example, these inspections may have been performed approximately two years after a date on which a training may have ended. As such, the model may not be able to learn from recent outcomes.

Figure 5A:
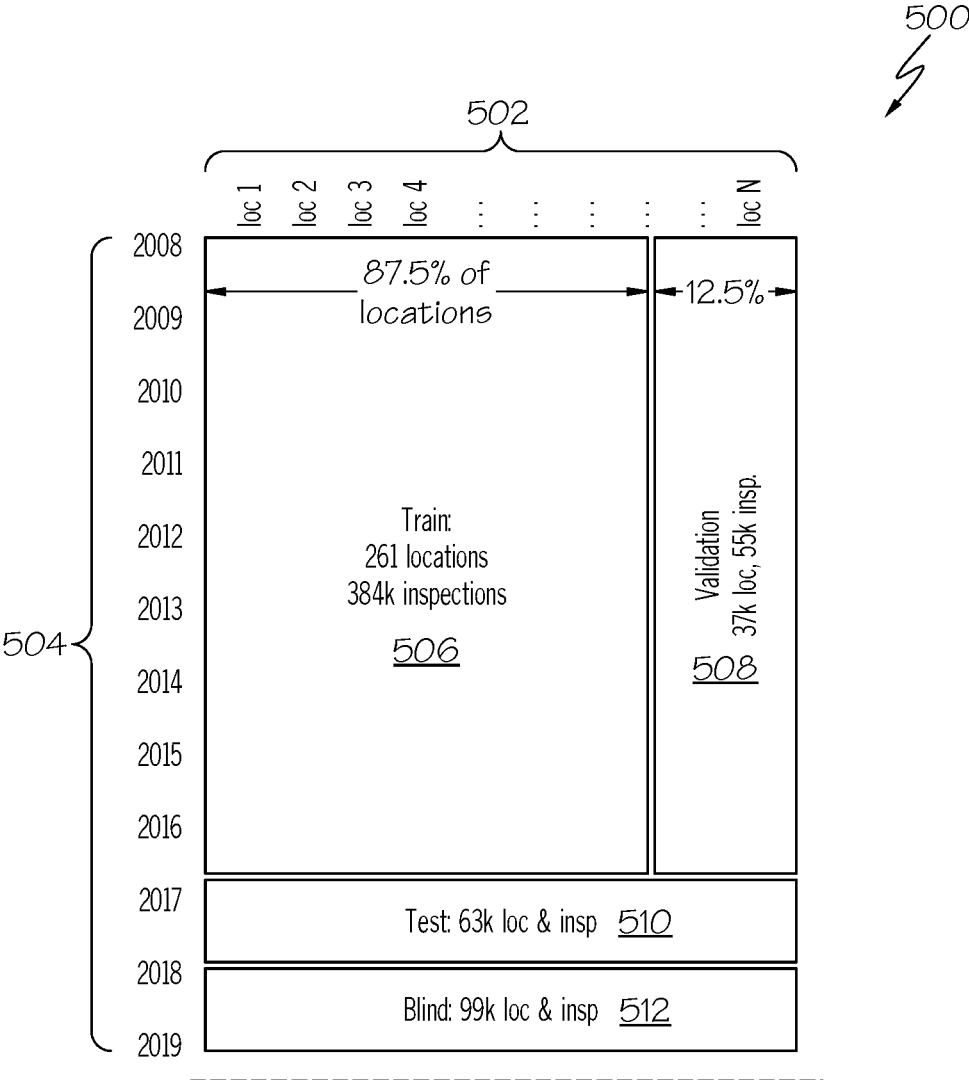
FIG. 5A depicts an illustration of the manner in which training data is utilized for training one or more of the machine learning models of the present disclosure, as described and illustrated herein.

FIG. 5A depicts an illustration of the manner in which training data may be utilized for training one or more of the machine learning models of the present disclosure, as described and illustrated herein. In particular, training data may be associated inspections performed with respect to various locations 502 over time frame 504, e.g., years 2008 to 2019. Details regarding the manner in which the model is trained, namely the manner in which training data may be divided, analyzed, and so forth, are described below. In embodiments, once the data is divided into appropriate sets, a post-processing probability calibration step may be performed. The post-processing step may ensure that that model provides predictions that are accurate to a particular threshold value, e.g., predictions regarding the probability of initiation of corrosion at a particular location may satisfy an accuracy threshold. It is noted that probability calibration does not change the relative ordering of the scores. Instead, the predicted scores are merely rescaled such that they are better aligned with actual probabilities of the initiation of corrosion.

In embodiments, isotonic regression may be applied to a particular subset of the training set (e.g., a different subset). It is noted that the isotonic regression is performed for probability calibration of the predicted probability of each class (e.g., piping condition). It is further noted that probability calibration can also be done in ways that vary from isotonic regression. Further, raw predicted probability may be skewed for various reasons, e.g., reasons relating to sampling and modeling of the data. Calibration corrects these effects. As a result of this exercise, an initiation probability of larger than 6% corresponds to an initiation prediction that will likely trigger an output reflecting, e.g., TRT positive (e.g., presence of moisture and corrosion byproduct on the surface of an asset), while an initiation probability of less than 0.5% will likely return an output of, e.g., TRT negative (e.g., absence of moisture and corrosion byproduct on the surface of an asset). Various model predictions are presented in the second half of Table 2 above.

As stated above, the classifier can be trained and tested with cross-validation and the accuracy of the predictions may be evaluated with respect to the entire training dataset. In an example exercise, the prediction population may be approximately 261,413 unique locations, in which approximately 384,000 inspections may have been performed, as illustrated in section 506. Of these locations, approximately 14,999 may have returned a probability of corrosion initiation that was larger than 6%. Among these, 1,798 of the locations may have been recorded as TRT positive from inspections on the field, indicating they are "True Finds", or True Positive. As such, these results indicate an accurate corrosion initiation find rate of approximately 11.99%. It is noted that, for validation and testing purposes, a set of 37,000 locations (that are different from the 384,000 locations) may be identified and 55,000 inspections may be performed for these 37,000 locations, as illustrated in section 508. Further, as illustrated in sections 510 and 512, a testing dataset of 63,000 (including locations and inspections) may be designated for additional testing and an additional data set of 99,000 (including additional locations and inspections) may be designated for blind testing.

In embodiments, as part of additional testing, 136,659 locations may have been predicted as having an initiation probability of less than 0.5%, out of which 111 were recorded TRT positive in the field. This constitutes "False Omissions", or False Negative, which allows the calculation of False Omission Rate as False Omissions divided by predicted TRT negative cases. These two metrics are combined to provide an indication of performance of the model. It is noted that, as listed in Table 2, the corrosion initiation find rate of 11% is approximately ten times greater than the baseline rate of 1.5%, and the false omission rate is ten times less than the baseline rate. The test results listed in Table 2 above verifies that the model achieves particular goals, e.g., the goals of better identify locations with high likelihood of corrosion initiation while also distinguishing locations with low probability of initiation for inspection planning. Similar exercises were extended to the remaining sets—Validation, Test and Blind, using a model trained on the Train set. The full results are presented in Table 2.

It is noted that, as stated above, the training, calibration, validation, and testing techniques described herein are meant to accurately determine and quantify corrosion likelihood, while avoiding the adverse effects of overfitting. It is further noted, in order improve prediction accuracy of the machine learning model, the model may be retrained using selected features and a full history of all of the locations and TRT inspection outcomes, including the most recent and relevant data. The retraining includes cross-validation and probability calibration.

Figure 5B:
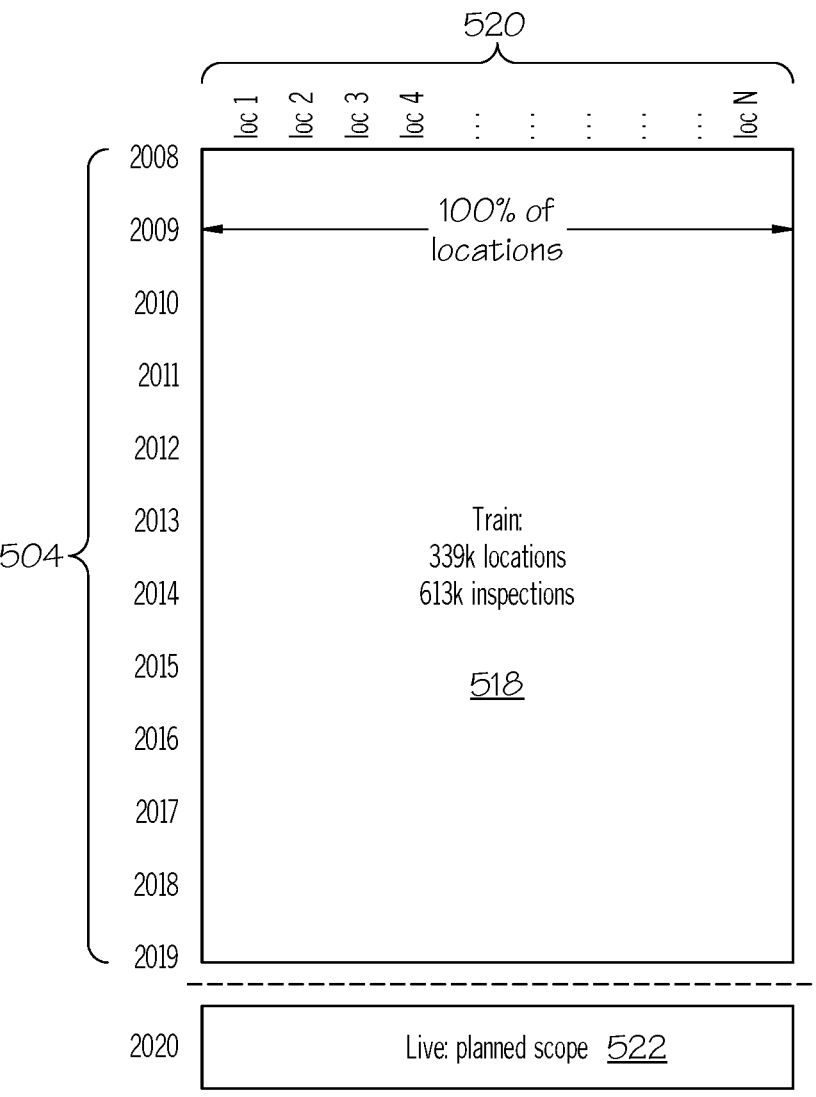
FIG. 5B illustrates data associated with a live application of a machine learning trained model of the present disclosure, according to one or more embodiments described and illustrated herein.

An implementation of a trained model (e.g., a live trained model) may have only two logical sets of data, which are illustrated in FIG. 5B and shown in Table 3 below. It is noted that FIG. 5B lists a training dataset of locations 520 (e.g., locations 1 to locations N amounting to 339,000 locations) over the time frame 504 (from years 2008 to 2019), with 613,000 inspections that are performed with respect to these locations, as shown in section 518. It is noted that section 522 is associated with a live implementation of a model, e.g., a trained model that may have run in 2020.

TABLE 3

| Corrosion initiation live model training and live validation performance | | | |
|---|---|---|---|
| | | Live Train | Live Validation |
| Inspection results all locations | Unique locations | 333,403 | 23,449 |
| | Start date | Jan. 1, 2008 | Aug. 1, 2019 |
| | End date | Jun. 28, 2019 | Sep. 29, 2019 |
| | Inspections count | 581,639 | 23,449 |

TABLE 3-continued

| | | Corrosion initiation live model training and live validation performance | |
|---|---|---|---|
| | | Live Train | Live Validation |
| | Corrosion Finds | 9,880 | 372 |
| | Baseline Rate (%) | 1.70% | 1.59% |
| Model Results | Count | 46,421 | 1,999 |
| (P >= 6%) | True Finds | 4570 | 129 |
| | Find Rate (%) | 9.8% | 6.45% |
| Model Results | Count | 238,660 | 10,278 |
| (P < 0.5%) | False Omissions | 338 | 25 |
| | False Omission Rate (%) | 0.14% | 0.24% |

Regarding the full train set, all locations with complete histories may be utilized to train the machine learning model. After the model makes various predictions, new inspections may be performed after one year.

It is noted that a short tem remaining thickness machine learning based model is also contemplated (e.g., a second model). This model is configured to help prioritize, for follow-up purposes, the performing of inspections for a list of locations known to have corrosion. At any time, one or more of a subset of locations on which recently inspected locations may be known to be suffering from corrosion. Inspections or appropriate follow up may not yet have been performed with respect to these locations. The follow-up involves removal and eventual replacement of jacket and insulation, and in some cases may even involve replacing or repairing one or more portions of pipes or entire pipes. Therefore, it is a far more involved and costly task than a TRT scan.

Priority for follow up may be set based upon estimates of corrosion damage from the last positive TRT, and other factors that affect the risk, such as the pipe service. The TRT estimates represent data about the depth of the defect based on the size of visible corrosion byproduct present in the TRT images. There are two ways in which estimating depth of a defect may be improved using the machine learning model—improving initial estimates of likelihood of corrosion by considering the full histories and available facts from the corroding locations and estimating further progression of corrosion between the time at which a TRT inspection is performed and the time of the follow-up.

It is noted that a dependent variable of this model may be a maximum corrosion-induced wall loss. It is the measured depth of the deepest corrosion pit that can be found when an inspection location is exposed by removing jacket and insulation and cleaning off all corrosion byproduct. Because the model is fit on, and in turn predicts the metal loss, predictions of loss may be translated to predictions of thickness by subtracting from the nominal wall thickness of the pipe.

In embodiments, this model may be utilized to determine accurate information that may alter the decisions about follow-up inspection scheduling. Currently, those decisions are based on experience and know-how of the technicians who interpret the TRT results, and may be categorized in the form of a piping condition grade. In embodiments, the pipe condition grades may be classified as: "no corrosion, no damage", "corrosion initiated, damage estimated to <20% loss from nominal wall thickness", "corrosion wall loss estimated to between 20% and 40% wall loss", "corrosion wall loss estimated to between 40% and 60% wall loss", "corrosion wall loss estimated to between 60% and 80% wall loss", and "wall loss>80%". It is noted that other classifications and descriptions are also contemplated.

In order to mitigate damage, the worst wall loss may be measured precisely, and those measurements may be translated to a grade as well. The wall loss at a future mitigation time is an outcome from which the model may predict and learn. For comparison purposes, those actual measurements are translated, as well as the model predictions, to grades based on wall thickness bins as above. These results are presented below.

TABLE 4A

| Training and Prediction Using Training data Out of bag predictions on training |
|---|
| Total 13,866 |
| Percent correct: 64 |
| Percent worse than predicted: 20 |
| Percent worse than predicted by 2 or more grades: 2 |

TABLE 4B

| | | Training set out of bag predictions | | | | | |
|---|---|---|---|---|---|---|---|
| | | F | E | D | C | B | A |
| Actual | F | 0 | 2 | 7 | 8 | 1 | 0 |
| UT | E | 0 | 4 | 52 | 92 | 15 | 0 |
| | D | 0 | 4 | 106 | 577 | 146 | 0 |
| | C | 0 | 3 | 91 | 2453 | 1826 | 0 |
| | B | 0 | 0 | 37 | 2129 | 6276 | 0 |
| | A | 0 | 0 | 0 | 6 | 31 | 0 |

TABLE 5

| | | Test set predictions | | | | | |
|---|---|---|---|---|---|---|---|
| | | F | E | D | C | B | A |
| Actual | F | 0 | 1 | 3 | 5 | 1 | 0 |
| UT | E | 0 | 0 | 9 | 28 | 2 | 0 |
| | D | 0 | 2 | 27 | 158 | 31 | 0 |
| | C | 0 | 3 | 35 | 605 | 418 | 0 |
| | B | 0 | 1 | 7 | 560 | 1616 | 0 |
| | A | 0 | 0 | 0 | 1 | 7 | 0 |

TABLE 6A

| | | Inspector estimates | | | | | |
|---|---|---|---|---|---|---|---|
| | | F | E | D | C | B | A |
| Actual | F | 1 | 2 | 6 | 14 | 5 | 0 |
| UT | E | 5 | 11 | 41 | 70 | 75 | 0 |
| | D | 8 | 14 | 161 | 353 | 515 | 0 |
| | C | 3 | 7 | 286 | 1239 | 3899 | 0 |
| | B | 0 | 2 | 260 | 1027 | 9337 | 0 |
| | A | 0 | 0 | 2 | 7 | 36 | 0 |

TABLE 6B

| |
|---|
| Total: 17,386 |
| Percent correct: 62 |
| Percent worse than predicted: 29 |
| Percent worse than predicted by 2 or more grades: 4 |

Long Term Remaining Wall Thickness Model

In embodiments, a long term remaining wall thickness model may be trained to determine loss of a thickness of a wall over a time frame. The model may be trained to provide predictions of piping condition grades with improved accuracy. Simultaneously, the model may be less likely to make optimistic predictions. Optimistic predictions may result in a delay of scheduling a follow up of performing repairs associated with one or more locations that are in most urgent need of it. It is noted that a naïve strategy of avoiding an optimistic prediction—a safety margin for every prediction—may only be partially helpful because it may not improve the process of prioritizing the performing of an inspection for a particular location instead of another location.

Prioritizing some inspections due to a higher predicted chance of finding corrosion initiation necessarily may mean that other locations, predicted as having a lower chance to corrode, may have to be postponed in order to make room in the inspection plan. The results of the corrosion initiation model above may show that the locations that are predicted as very unlikely to corrode may have very few incidences of new corrosion, and therefore are associated with a lower risk of corrosion. However, given large numbers of locations with low scores, there may always be at least a few among them that do corrode. This is because corrosion can initiate in the field due to random events, or factors that are not captured in the features given to the model. Damage may be caused due to random events such as, e.g., snow clearing operations, improperly applied seals, animal activity, and so forth.

The model discussed in this section attempts to predict the worst-case outcome in the event that this deferral fails in detect an initiation of corrosion. This model has two stages—a first stage is associated with predicting long term expected metal loss at a deepest pit or part of every individual location (the model operating under the assumption that the location is corroding), and a second stage that is associated with predicting a worst-case thickness margin based on prior distribution of errors of metal loss.

TABLE 7A

| Training outcome: out-of-bag prediction |
| --- |
| Total predictions: 7371 |
| Percent correct: 58 |
| Percent worse than predicted 19 |
| Percent worse than predicted by 2 or more grades 2 |

TABLE 7B

| | | Out-of-bag model predictions | | | | |
| --- | --- | --- | --- | --- | --- | --- |
| | | F | E | D | C | B | A |
| Actual | F | 0 | 0 | 0 | 11 | 0 | 0 |
| UT | E | 0 | 0 | 8 | 54 | 11 | 0 |
| | D | 0 | 1 | 13 | 400 | 77 | 0 |
| | C | 0 | 0 | 33 | 1557 | 856 | 0 |
| | B | 0 | 0 | 14 | 1617 | 2716 | 0 |
| | A | 0 | 0 | 0 | 1 | 2 | 0 |

TABLE 7C

| Training outcome: test set predictions |
| --- |
| Total predictions: 1907 |
| Percent correct: 59 |

TABLE 7C-continued

| Training outcome: test set predictions |
| --- |
| Percent worse than predicted 20 |
| Percent worse than predicted by 2 or more grades: 2 |

TABLE 8

| | | Out-of-bag model predictions | | | | |
| --- | --- | --- | --- | --- | --- | --- |
| | | F | E | D | C | B | A |
| Actual | F | 0 | 0 | 0 | 3 | 0 | 0 |
| UT | E | 0 | 0 | 0 | 20 | 2 | 0 |
| | D | 0 | 0 | 3 | 114 | 21 | 0 |
| | C | 0 | 0 | 5 | 412 | 213 | 0 |
| | B | 0 | 0 | 2 | 394 | 714 | 0 |
| | A | 0 | 0 | 0 | 3 | 1 | 0 |

Predictions for all the models may be made for individual locations as described. However, inspections may be done as campaigns covering large equipment or facilities. Each of these can be thought of as a collection of individual constituent locations—as few as several dozen to as many as several thousand. In order to enable inspection planning and decision making at the level of equipment and facility, multiple model predictions have been utilized in conjunction.

FIG. 6 is a flow diagram depicts a process for determining a likelihood of corrosion specific to at least one component based on analyzing one more operation conditions specific to at least a portion of the at least one component, according to one or more embodiments described and illustrated herein.

In block 602, data associated with a portion of at least one component may be received. The data may describe one or more operating conditions of the component. In embodiments, the at least one component may be an asset in the form of a pipe, and a portion of the pipe may refer to a section of a pipe. In embodiments, the data may describe various characteristics associated with the pipe and/or a portion of the pipe. For example, the data may describe dimensions of the pipe, whether an inspection (e.g., TRT inspection) has been performed on the pipe, how often or how recently inspections were performed, and so forth. Further, the data may also describe fluid flow rates associated with the pipe, an accumulation of moisture and corrosion byproduct, and so forth. It is noted that a variety of other features related to the asset (e.g., the pipe) are also contemplated.

In block 604, a machine learning model may be applied to the data associated with the portion of the pipe. In an example implementation of the present disclosure, the corrosion initiation model as described above may correspond to a first machine learning model that is applied to the data. It is noted that, as described above, the corrosion initiation model utilizes a sequential deep learning neural network. It is further noted that the first machine learning model may operate in combination or conjunction with multiple machine learning models, as described above. It is further noted that, in embodiments, a second machine learning model may be trained for predicting a depth measurement associated with another pipe or asset (e.g., an additional component), namely a depth value that is specific to the pipe. The depth value may correspond to a deepest portion (deepest pit) associated with the pipe. In embodiments, a third machine learning model may be trained for predicting a thickness value of a wall of a pipe at a particular depth, e.g., at a deepest portion of the pipe.

In block 606, responsive to the application of the at least one machine learning model, a likelihood of corrosion specific to the at least one component based at least in part on the one or more operating conditions of the portion may be determined. In embodiments, the accumulation of moisture or corrosion byproduct is representative of an operating condition of the asset. The amount of accumulation of moisture and/or corrosion byproduct on at least the portion (or portions) of a pipe may be utilized to determine an extent and likelihood of corrosion of that component. In embodiments, an accumulation of moisture and/or corrosion byproduct that meets or exceeds a particular threshold may be indicative of a high likelihood that the pipe may have undergone corrosion. Alternatively or additionally, a particular amount of accumulation of moisture or corrosion byproduct may also be utilized to determine whether it is advisable to perform an additional inspection on a particular portion of the pipe within a particular time frame or if the inspection may be deferred to a later date, e.g., if it is determined that the likelihood of corrosion is low.

In block 608, data of the likelihood of corrosion specific to the at least one component (e.g., a portion of a pipe) may be output on a display that is communicatively coupled to at least one processor of a computing device. It is noted that the at least one machine learning model may be applied using the at least one processor of the computing device and the results of the machine learning model may be presented (e.g., output) on the display in various ways, e.g., as part of a chart, text, and/or a combination thereof. It is noted that, in embodiments, the output may also be in the form of two dimensional or three dimensional representations of various sections of pipes (e.g., weldpacks) with data relating to a likelihood of corrosion being displayed in association with one or more of these sections.

Figure 7:
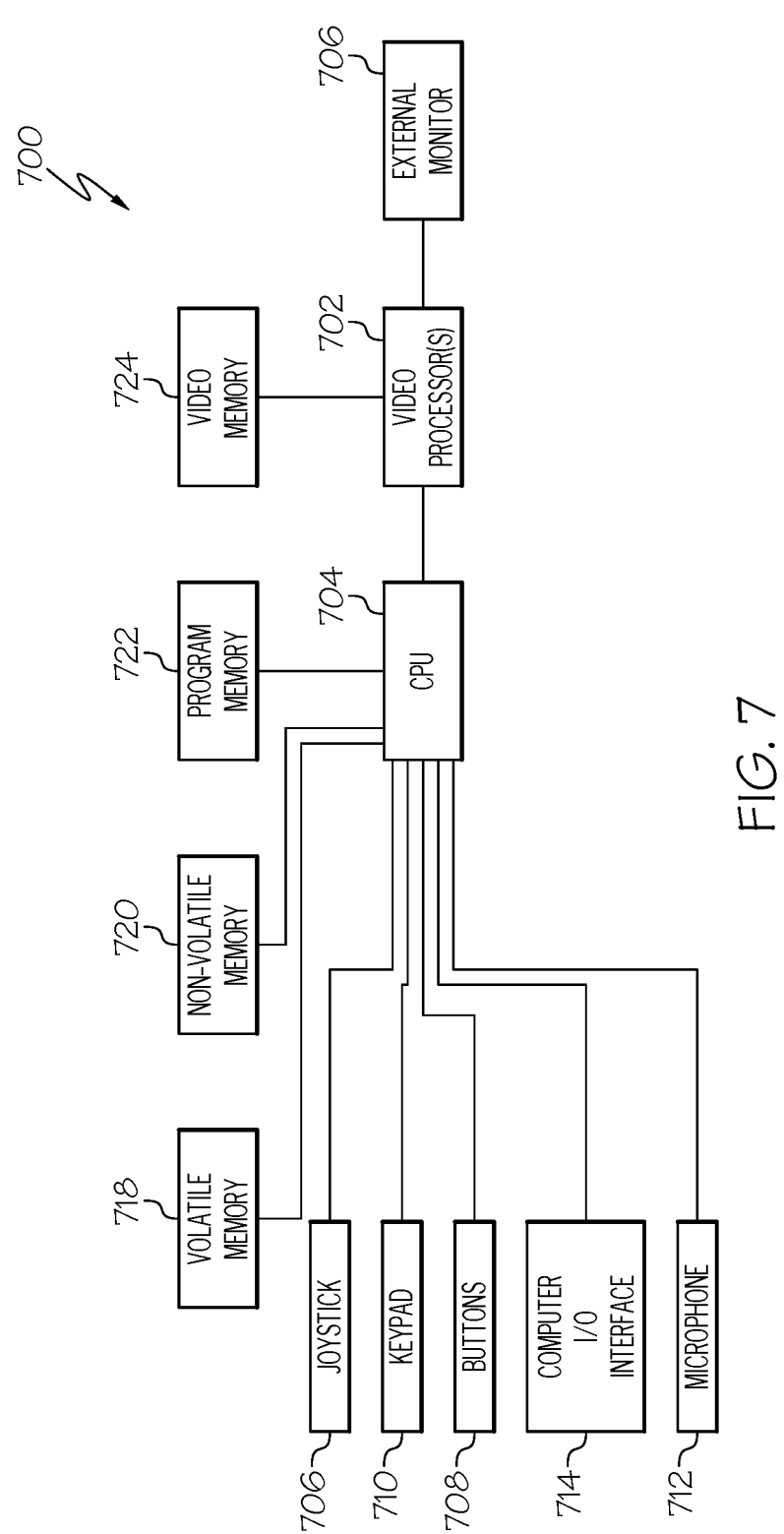
FIG. 7 depicts a computing system that applies one or more of the machine learning models of the present disclosure for determining a likelihood of corrosion of a component, according to one or more embodiments described and illustrated herein.

FIG. 7 depicts a computing system 700 that applies one or more of the machine learning models of the present disclosure for determining a likelihood of corrosion of a component, according to one or more embodiments described and illustrated herein.

The video processor 702 can provide/receive commands, status information, streaming video, still video images, and graphical overlays to/from the CPU 704 and may be comprised of FPGAs, DSPs, or other processing elements which provide functions such as image capture, image enhancement, graphical overlay merging, distortion correction, frame averaging, scaling, digital zooming, overlaying, merging, flipping, motion detection, and video format conversion and compression.

The CPU 704 can be used to manage the user interface by receiving input via a joystick 706, buttons 708, keypad 710, and/or microphone 712, in addition to providing a host of other functions, including image, video, and audio storage and recall functions, system control, and measurement processing. The joystick 706 can be manipulated by the user to perform such operations as menu selection, cursor movement, slider adjustment, and so forth. The buttons 708 and/or keypad 710 also can be used for menu selection and providing user commands to the CPU 704 (e.g., freezing or saving a still image). The microphone 712 can be used by the inspector to provide voice instructions to freeze or save a still image.

The video processor 702 can also communicate with video memory 724, which is used by the video processor 702 for frame buffering and temporary holding of data during processing. The CPU 704 can also communicate with CPU program memory 722 for storage of programs executed by the CPU 704. In addition, the CPU 704 can be in communication with volatile memory 718 (e.g., RAM), and non-volatile memory 720 (e.g., flash memory device, a hard drive, a DVD, or an EPROM memory device). The non-volatile memory 720 is the primary storage for streaming video and still images.

The CPU 704 can also be in communication with a computer I/O interface 714, which provides various interfaces to peripheral devices and networks, such as USB, Firewire, Ethernet, audio I/O, and wireless transceivers. This computer I/O interface 714 can be used to save, recall, transmit, and/or receive still images, streaming video, or audio. For example, a USB "thumb drive" or CompactFlash memory card can be plugged into computer I/O interface 714. In addition, the computing system 800 can be configured to send frames of image data or streaming video data to an external computer or server. The computing system 700 can incorporate a TCP/IP communication protocol suite and can be incorporated in a wide area network including a plurality of local and remote computers, each of the computers also incorporating a TCP/IP communication protocol suite.

It will be understood that, while certain components have been shown as a single component (e.g., CPU 704) in FIG. 1, multiple separate components can be used to perform the functions of the CPU 704.

Exemplary technical effects of the methods, systems, and devices described herein include, by way of non-limiting example models for improved prediction of corrosion under insulation. Embodiments of the predictive models can be employed to plan future asset inspections in order to lower risk and improve inspection efficiency. In one aspect, embodiments of the predictive models can identify assets that are candidates for deferred inspection. In another aspect, embodiments of the predictive models can identify assets for which inspection should be prioritized. In a further aspect, embodiments of the predictive models can a subset of locations within an asset or facility at which a significant fraction of corrosion occurs. In an additional aspect, embodiments of the predictive models can provide improved estimates of current and near time corrosion severity for those locations that are identified as positive for active corrosion through non-destructive testing (NDT).

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

Further non-limiting aspects or embodiments are set forth in the following numbered clauses:

Clause 1: A method implemented using at least a processor, the method comprising: receiving data associated with a portion of at least one component, the data describing one or more operating conditions of the portion of the at least one component; applying, to the data associated with the portion, at least one machine learning model; determining, responsive to the applying of the at least one machine learning model, a likelihood of corrosion specific to the at least one component based at least in part on the one or more operating conditions of the portion; and outputting, automatically and without user intervention, the likelihood of corrosion specific to the at least one component on a display.

Clause 2: The method of clause 1, wherein the at least one machine learning model includes a first machine learning model that is based on a sequential deep learning neural network.

Clause 3: The method of clause 1 or claim 2, wherein the operating conditions are associated with at least one of an amount of moisture or an additional amount of corrosion byproduct on the portion of the at least one component.

Clause 4: The method of any of clauses 1 to 3, further comprising applying, to the data associated with the portion, the at least one machine learning model, wherein the at least one machine learning model includes a second machine learning model trained for predicting a depth measurement associated with an additional component.

Clause 5: The method of clause 4, wherein depth value specific to the additional component is associated with a portion of the additional component and is larger that at least one addition portion of the additional component.

Clause 6: The method of clause 4, wherein the operations further comprise predicting, responsive to the applying of the second machine learning model, a thickness value of the additional component at the depth value that is associated with the portion of the additional component.

Clause 7: The method of clause 4, wherein the second machine learning model is based on random forest regression.

Clause 8: The method of any of clauses 1 to 7, further comprising: classifying the at least one component as including the portion that is corroding based on the likelihood of corrosion satisfying or exceeding a threshold value; receiving additional data associated with at least an additional portion of at least one additional component, the additional data describing one or more operating conditions specific to the at least one additional component; applying the at least one machine learning model to the additional data, wherein the at least one machine learning model is the first machine learning model; determining, responsive to the applying of the first machine learning model, an additional likelihood of corrosion specific to the at least one additional component; and classifying the at least one additional component as independent of corrosion at a first time based on the additional likelihood of corrosion satisfying or exceeding an additional threshold value.

Clause 9: The method of clause 8, further comprising applying, to the additional data associated with the at least one additional component, the at least one machine learning model, wherein the at least one machine learning model includes a third machine learning model; and applying, based on the third machine learning model, a bounded margin to the at least one addition component.

Clause 10: The method of claim 9, further comprising reclassifying the at least one additional component as including the corrosion at a second time.

Clause 11: A system comprising: at least one processor, a display that is communicatively coupled to the at least one processor; and at least one non-transitory storage media storing instructions that, when executed by the at least one processor, cause the at least one processor to perform operations comprising: receiving data associated with a portion of at least one component, the data describing one or more operating conditions of the portion of the at least one component; applying, to the data associated with the portion, at least one machine learning model; determining, responsive to the applying of the at least one machine learning model, a likelihood of corrosion specific to the at least one component based at least in part on the one or more operating conditions of the portion; and outputting, automatically and without user intervention, the likelihood of corrosion specific to the at least one component on the display.

Clause 12: The system of clause 11, wherein the at least one machine learning model includes a first machine learning model that is based on a sequential deep learning neural network.

Clause 13: The system of clause 11 or 12, wherein the operating conditions are associated with at least one of an amount of moisture or an addition amount of corrosion byproduct on the portion of the at least one component.

Clause 14: The system of any of clauses 10-13, wherein the operations further comprising applying, to the data associated with the portion, the at least one machine learning model, wherein the at least one machine learning model includes a second machine learning model trained for predicting a depth measurement associated with an additional component; and predicting, responsive to the applying of the second machine learning model, a depth value specific to the additional component.

Clause 15: The system of clause 14, wherein the depth value specific to the additional component is associated with a portion of the additional component and is larger that at least one addition portion of the additional component.

Clause 16: The system of clause 14, wherein the operations further comprising predicting, responsive to the applying of the second machine learning model, a thickness value of the additional component at the depth value that is associated with the portion of the additional component.

Clause 17: The system of clause 14, wherein the second machine learning model is based on random forest regression.

Clause 18: The system of any of clauses 11-17, wherein the operations further comprising: classifying the at least one component as including the portion that is corroding based on the likelihood of corrosion satisfying or exceeding a threshold value; receiving additional data associated with at least an additional portion of at least one additional component, the additional data describing one or more operating conditions specific to the at least one additional component; applying the at least one machine learning model to the additional data, wherein the at least one machine learning model includes a first machine learning model; determining, responsive to the applying of the first machine learning model, an additional likelihood of corrosion specific to the at least one additional component; and classifying the at least one additional component as independent of corrosion at a first time based on the additional likelihood of corrosion satisfying or exceeding an additional threshold value.

Clause 19: The system of clause 18, wherein the operations further comprising: applying, to the additional data associated with the at least one additional component, the at least one machine learning model, wherein the at least one machine learning model includes a third machine learning model; and applying, based on the third machine learning model, a bounded margin to the at least one addition component.

Clause 20: The system of clause 19, wherein the operations further comprising reclassifying the at least one additional component as including the corrosion at a second time.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The transitional term "comprising," which is synonymous with "including," "containing," or "characterized by," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed embodiments.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

In the descriptions herein and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. A method comprising:
   receiving, by at least one processor of a computing system, first data characterizing a portion of a pipeline, the first data comprising data characterizing one or more physical characteristics and one or more operational characteristics of the portion of the pipeline;
   receiving, by the at least one processor, second data characterizing one or more environmental conditions surrounding the portion of the pipeline;
   determining, by the at least one processor, using at least one machine learning model, a likelihood of corrosion for the portion of the pipeline based on the first data and the second data;
   generating, by the at least one processor, a visual representation of the portion of the pipeline, wherein the visual representation comprises an indication of the likelihood of corrosion for the portion of the pipeline;
   classifying, by the at least one processor, using a classifier of the at least one machine learning model, a piping condition grade for the portion of the pipeline based on the likelihood of corrosion;
   scheduling a follow-up inspection based on the piping condition grade; and
   transmitting, by the at least one processor to a user interface display of the computing system, the visual representation.

2. The method of claim 1, wherein the at least one machine learning model includes a sequential deep learning neural network.

3. The method of claim 1, wherein the first data comprises data associated with an amount of moisture or an amount of corrosion byproduct on the portion of the pipeline.

4. The method of claim 1, wherein the first data further includes data characterizing a measured depth of a deepest corrosion pit in the portion of the pipeline, the method further comprising:
   predicting, by the at least one processor, using the at least one machine learning model, a future depth of the deepest corrosion pit at a future time.

5. The method of claim 4, further comprising:
   determining, by the at least one processor, using the at least one machine learning model, a thickness value characterizing a thickness of a wall of the pipeline at the deepest corrosion pit.

6. The method of claim 4, wherein the at least one machine learning model comprises a random forest regression model.

7. The method of claim 1, further comprising:
   determining, by the at least one processor, using the at least one machine learning model, a bounded margin associated with the portion of the pipeline, the bounded margin characterizing a worst-case corrosion outcome for the portion of the pipeline.

8. The method of claim 7, further comprising reclassifying, by the at least one processor, using the classifier, the piping condition grade for the portion of the pipeline based on the bounded margin.

9. A system, comprising:
   at least one processor, and
   memory storing instructions that, when executed by the at least one processor, cause the at least one processor to perform operations comprising:
      receiving first data characterizing a portion of a pipeline, the first data comprising data characterizing one or more physical characteristics and one or more operational characteristics of the portion of the pipeline;
      receiving second data characterizing one or more environmental conditions surrounding the portion of the pipeline;
      determining, using for the portion of the pipeline based on the first data and the second data;
      generating a visual representation of the portion of the pipeline, wherein the visual representation comprises an indication of the likelihood of corrosion for the portion of the pipeline;
      classifying, using a classifier of the at least one machine learning model, a piping condition grade for the portion of the pipeline based on the likelihood of corrosion;
      scheduling a follow-up inspection based on the piping condition grade; and
      transmitting, to a user interface display, the visual representation.

10. The system of claim 9, wherein the at least one machine learning model includes a sequential deep learning neural network.

11. The system of claim 9, wherein the first data comprises data associated with an amount of moisture or an amount of corrosion byproduct on the portion of the pipeline.

12. The system of claim 9 wherein the first data further includes data characterizing a measured depth of a deepest corrosion pit in the portion of the pipeline, wherein the operations further comprise:
   predicting, using the at least one machine learning model, a future depth of the deepest corrosion pit at a future time.

13. The system of claim 12, wherein the operations further comprise determining, using the at least one machine learning model, a thickness value characterizing a thickness of a wall of the pipeline at the deepest corrosion pit.

14. The system of claim 12, wherein the at least one machine learning model comprises a random forest regression model.

15. The system of claim 9, wherein the operations further comprise:

determining, using the at least one machine learning model, a bounded margin associated with the portion of the pipeline, the bounded margin characterizing a worst-case corrosion outcome for the portion of the pipeline.

16. The system of claim 15, wherein the operations further comprise reclassifying, using the classifier, the piping condition grade for the portion of the pipeline based on the bounded margin.

* * * * *